(12) United States Patent
Park et al.

(10) Patent No.: US 8,570,463 B2
(45) Date of Patent: Oct. 29, 2013

(54) LIQUID CRYSTAL DISPLAY DEVICE

(75) Inventors: Seung-Ho Park, Seoul (KR); Chul Nam, Gyeongsangbuk-do (KR); Hyong-Jong Choi, Jeonju-si (KR)

(73) Assignee: LG Display Co., Ltd., Seoul (KR)

( * ) Notice: Subject to any disclaimer, the term of this patent is extended or adjusted under 35 U.S.C. 154(b) by 333 days.

(21) Appl. No.: 12/953,030

(22) Filed: Nov. 23, 2010

(65) Prior Publication Data

US 2011/0141411 A1   Jun. 16, 2011

(30) Foreign Application Priority Data

Dec. 16, 2009   (KR) .................. 10-2009-0125574

(51) Int. Cl.
*G02F 1/1335* (2006.01)

(52) U.S. Cl.
USPC ............... 349/98; 349/96; 349/97; 349/113; 349/137; 349/106; 438/107; 438/329; 438/29; 438/34; 428/1.32; 428/1.33

(58) Field of Classification Search
USPC ............ 349/96–98, 113, 137, 106; 359/499; 428/1.32, 1.33
See application file for complete search history.

(56) References Cited

U.S. PATENT DOCUMENTS

| | | | | |
|---|---|---|---|---|
| 5,783,299 | A * | 7/1998 | Miyashita et al. | 428/329 |
| 7,868,957 | B2 * | 1/2011 | Yamazaki et al. | 349/43 |
| 2003/0076462 | A1 * | 4/2003 | Nishimura et al. | 349/113 |
| 2004/0046909 | A1 * | 3/2004 | Sekiguchi | 349/113 |
| 2005/0174509 | A1 * | 8/2005 | Sawayama et al. | 349/65 |
| 2006/0061719 | A1 * | 3/2006 | Tomioka et al. | 349/123 |
| 2007/0146887 | A1 * | 6/2007 | Ikeda et al. | 359/586 |
| 2008/0160257 | A1 * | 7/2008 | Takada et al. | 428/145 |

FOREIGN PATENT DOCUMENTS

| | | | | |
|---|---|---|---|---|
| CN | 1405604 A | | 3/2003 | |
| KR | 10-2009-0015373 | * | 2/2009 | ............ G02B 5/30 |
| KR | 10-2009-0015373 A | | 2/2009 | |
| KR | 10-2009-0079322 | * | 7/2009 | ............ G02B 5/30 |

* cited by examiner

*Primary Examiner* — Edward Glick
*Assistant Examiner* — Sang V Nguyen
(74) *Attorney, Agent, or Firm* — Birch, Stewart, Kolasch & Birch, LLP

(57) ABSTRACT

A liquid crystal display device includes: a liquid crystal panel; a first polarizing film and a second polarizing film on a bottom surface and a top surface, respectively, of the liquid crystal panel; a backlight unit below the first polarizing film; and a titanium oxide film on the second polarizing film and that transmits one of right-handed circularly polarized light and left-handed circularly polarized light and reflects the other, with a predetermined wavelength, of the right-handed circularly polarized light and the left-handed circularly polarized light.

7 Claims, 4 Drawing Sheets

LIQUID CRYSTAL DISPLAY DEVICE

The present invention claims the priority benefit of Korean Patent Application No. 10-2009-0125574, filed in Korea on Dec. 16, 2009, which is hereby incorporated by reference for all purposes as if fully set forth herein.

BACKGROUND OF THE INVENTION

1. Field of the Invention

The present invention relates to a liquid crystal display device.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that voltages applied to the electrodes induce an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

FIG. 1 is a cross-sectional view illustrating an LCD device according to the related art.

Referring to FIG. 1, the LCD device 1 includes a liquid crystal panel 30 and a backlight unit 90 below the liquid crystal panel 30. The liquid crystal panel 30 includes first and second substrates 5 and 10, a liquid crystal layer 15 between the first and second substrates 5 and 10.

Although not shown in the drawings, a gate line and a data line crossing each other and defining a pixel region P are formed on the first substrate 5. In the pixel region P, a switching region S is defined where a thin film transistor Tr is formed.

The thin film transistor Tr includes a gate electrode 25, a gate insulating layer 45, a semiconductor layer 40, and source and drain electrodes 32 and 34. The gate electrode 25 is connected to the gate line, and the gate insulating layer 45 covers the gate electrode 25. The semiconductor layer 40 is on the gate insulating layer 45 and corresponds to the gate electrode 25. The semiconductor layer 40 includes an active layer made of intrinsic amorphous silicon, and an ohmic contact layer made of extrinsic amorphous silicon. The source electrode 32 is connected to the data line, and the drain electrode 34 is spaced apart from the source electrode 32. The source and drain electrodes 32 and 34 are on the semiconductor layer 40.

A passivation layer 55 is formed on the thin film transistor Tr and includes a drain contact hole DCH exposing the drain electrode 34. A pixel electrode 70 is formed on the passivation layer 55 of each pixel region P. The pixel electrode 70 is made of a transparent conductive material.

A black matrix 12 is formed on the second substrate 10 and shields the gate and data lines and the thin film transistor Tr. A color filter layer 16 is formed on the black matrix 12 and includes red (R), green (G) and blue (B) color filter patterns 16a, 16b and 16c in the respective pixel regions P. A common electrode 75 is formed on the color filter layer 16 and is made of a transparent conductive material.

Although not shown in the drawings, first and second alignment layers are formed on the pixel and common electrodes 70 and 75, respectively.

The backlight unit 90 supplies light to the liquid crystal panel 30. A cold cathode fluorescent lamp (CCFL), an external electrode fluorescent lamp (EEFL), a hot cathode fluorescent lamp (HCFL), a light emitting diode (LED) or the like may be used for the backlight unit 90.

Recently, it is requested that an LCD device is seen in a specific color when the LCD device is in display off state. The LCD device is generally seen in gray, for example, black when the LCD device is in display off state. However, recently, electronic devices, for example, mobile stations employing the LCD device and a colored exterior case are produced. Accordingly, when the LCD device is in display off state, a user may feel that the black of the LCD device is not in harmony with the colored exterior case of the mobile station. To satisfy such the need, an LCD device using reflection property of cholesteric liquid crystal is proposed.

FIG. 2 is a cross-sectional view illustrating an LCD device using reflection property of cholesteric liquid crystal according to the related art.

Referring to FIG. 2, the LCD device 50 includes a liquid crystal panel 30, a backlight unit 90 below the liquid crystal panel 30, and a cholesteric liquid crystal film 80 on the liquid crystal panel 30.

The liquid crystal panel 30 has a structure similar to that of the liquid crystal panel of FIG. 1. In other words, as shown in FIG. 1, the liquid crystal panel 30 may include the first substrate 5, the second substrate 10 and the liquid crystal layer 15 between the first and second substrates 5 and 10.

In display on state, the backlight unit 90 emits light to the liquid crystal panel 30, thus the liquid crystal panel 30 produces images. The produced images through the liquid crystal panel 30 passes through the cholesteric liquid crystal film 80, thus the LCD device 50 finally displays the images viewed by a viewer.

The cholesteric liquid crystal film 80 includes third and fourth substrates 82 and 84, a separator 88 between adjacent pixel regions P, and a cholesteric liquid crystal layer 86 filling a space defined by the third and fourth substrates 82 and 84 and the separator 88. The cholesteric liquid crystal layer 86 includes cholesteric liquid crystal molecules 87.

The cholesteric liquid crystal molecules 87, for example, functions to transmit right-handed circularly polarized light and reflect left-handed circularly polarized light. Accordingly, the LCD device 50 can be seen in a specific color in display off state since the cholesteric liquid crystal film 80 selectively reflects an external light.

The cholesteric liquid crystal molecules 87 are arranged in helical twist along a vertical direction. The specific color seen due to the reflection of the cholesteric liquid crystal film 80 is determined by a helical pitch and a thickness of the cholesteric liquid crystal layer 86.

However, since the LCD device 50 requires the cholesteric liquid crystal film 80 additionally, manufacturing processes are complicated and production cost increases.

Further, a desired color is seen at front viewing angles, but other color is seen at side viewing angles.

Further, polarizing films are located on top and bottom surfaces of the liquid crystal panel 30. Among lights passing through the polarizing film on the top surface of the liquid crystal panel 30, left-handed circularly polarized light passes through the cholesteric liquid crystal film 80. Accordingly, light transmissivity of the LCD device 50 is reduced.

SUMMARY OF THE INVENTION

Accordingly, the present invention is directed to a liquid crystal display device and method of manufacturing the same that substantially obviates one or more of the problems due to limitations and disadvantages of the related art.

An advantage of the present invention is to provide a liquid crystal display device that can improve production efficiency and reliability.

Additional features and advantages of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes: a liquid crystal panel; a first polarizing film and a second polarizing film on a bottom surface and a top surface, respectively, of the liquid crystal panel; a backlight unit below the first polarizing film; and a titanium oxide film on the second polarizing film and that transmits one of right-handed circularly polarized light and left-handed circularly polarized light and reflects the other, with a predetermined wavelength, of the right-handed circularly polarized light and the left-handed circularly polarized light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to illustrated embodiments of the present invention, which are illustrated in the accompanying drawings.

Figure 1:
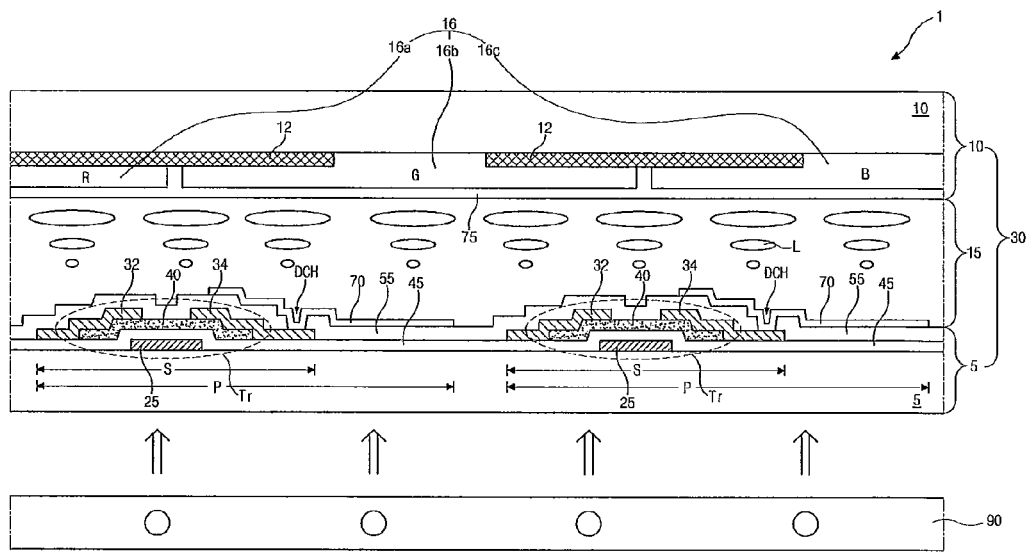
FIG. 1 is a cross-sectional view illustrating an LCD device according to the related art.
Figure 2:
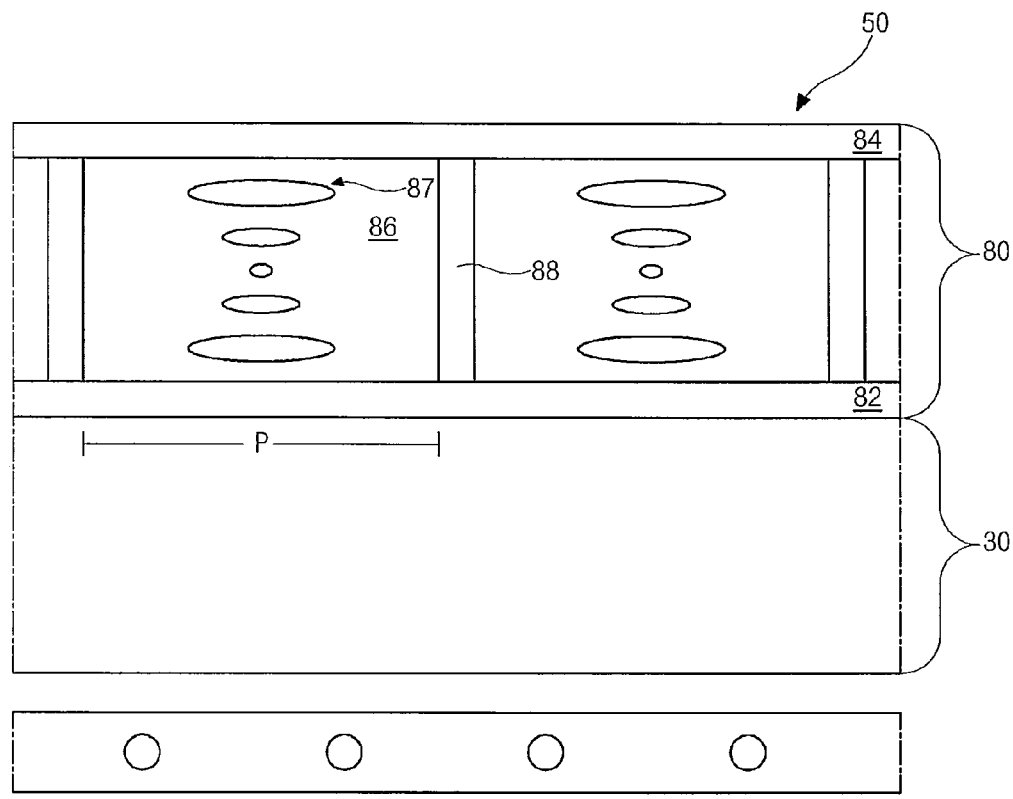
FIG. 2 is a cross-sectional view illustrating an LCD device using reflection property of cholesteric liquid crystal according to the related art.
Figure 3:
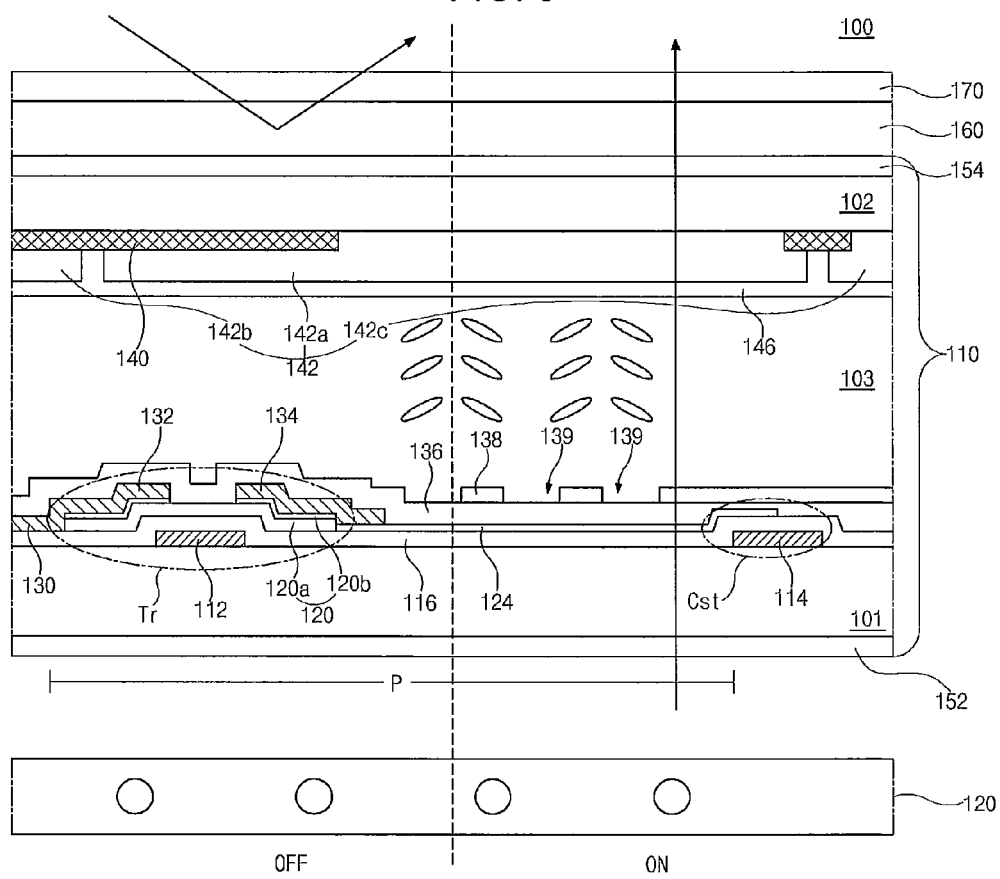
FIG. 3 is a schematic cross-sectional view illustrating an LCD device according to a first embodiment of the present invention.

FIG. 3 is a schematic cross-sectional view illustrating an LCD device according to a first embodiment of the present invention.

Referring to FIG. 3, the LCD device 100 includes a liquid crystal panel 110, first and second polarizing films 152 and 154 on bottom and top surfaces of the liquid crystal panel 110, respectively, a backlight unit 120 below the first polarizing film 152, and a titanium oxide ($TiO_2$) film 160 on the second polarizing film 154. Optionally, a protection substrate 170 may be formed on the titanium oxide film 160.

The liquid crystal panel 110 includes first and second substrate 101 and 102 facing each other, and a liquid crystal layer 103 between the first and second substrates 101 and 102.

A gate electrode 112 and a gate line 114 connected to the gate electrode 112 is formed on an inner surface of the first substrate 101. The gate electrode 112 and the gate line 114 may be formed in a single-layered structure using a metallic material, for example, aluminum (Al), aluminum alloy (e.g., AlNd), molybdenum (Mo), copper (Cu), or copper alloy. Alternatively, the gate electrode 112 and the gate line 114 may be formed in a multi-layered structure using the metallic material as recited above. For example, the gate electrode 112 and the gate line 114 may have a triple-layered structure that a first layer is made of copper (Cu), and second and third layers are located below and on the first layer and made of molybdenum-titanium alloy (MoTi).

A gate insulating layer 116 is formed to cover the gate electrode 112 and the gate line 114. The gate insulating layer 116 is made of an inorganic insulating material, for example, silicon oxide ($SiO_2$) or silicon nitride (SiNx).

A semiconductor layer 120 is formed on the gate insulating layer 116 and located to correspond to the gate electrode 112. The semiconductor layer 120 includes an active layer 120a and an ohmic contact layer 120b. The active layer 120a may be made of intrinsic amorphous silicon, and the ohmic contact layer 120b may be made of extrinsic amorphous silicon.

A pixel electrode 124 is formed on the gate insulating layer 116 and located to correspond to a pixel region P. The pixel electrode 124 is made of a transparent conductive material, for example, indium-tin-oxide (ITO), indium-zinc-oxide (IZO), or indium-tin-zinc-oxide (ITZO). The pixel electrode 124 may contact a side surface of the semiconductor layer 120, or be spaced apart from the semiconductor layer 120.

The pixel electrode 124 may overlap the gate line 114 to form a storage capacitor Cst. In other words, a portion of the gate line 114 and a portion of the pixel electrode 124 overlapping each other function as a first electrode and a second electrode, respectively, thus these overlapped portions form the storage capacitor Cst along with the gate insulating layer 116 therebetween.

A data line 130 crossing the gate line 114 to define the pixel region P is formed on the gate insulating layer 116.

A source electrode 132 and a drain electrode 134 are formed on the semiconductor layer 120. The source electrode 132 is connected to the data line 130, and the drain electrode 134 is spaced apart from the source electrode 132. The drain electrode 134 contacts the pixel electrode 124. The active layer 120a is exposed through a space between the source and drain electrodes 132 and 134.

The data line 130, the source electrode 132, and the drain electrode 134 may be formed in a single-layered structure using a metallic material, for example, aluminum (Al), aluminum alloy (e.g., AlNd), molybdenum (Mo), copper (Cu), or copper alloy. Alternatively, the data line 130, the source electrode 132, and the drain electrode 134 may be formed in a multi-layered structure using the metallic material as recited above. For example, the data line 130, the source electrode 132, and the drain electrode 134 may have a triple-layered structure that a first layer is made of copper (Cu), and second and third layers are located below and on the first layer and made of molybdenum-titanium alloy (MoTi).

The gate electrode 112, the gate insulating layer 116, the semiconductor layer 120, and the source and drain electrodes 132 and 134 form a thin film transistor Tr. The thin film transistor Tr is connected to the gate line 114, the data line 130 and the pixel electrode 124.

A passivation layer 136 may be formed to cover the thin film transistor Tr, the data line 130 and the pixel electrode 124. The passivation layer 136 may be made of an organic insulating material, for example, benzocyclobutene (BCB) or photo acrylic, or an inorganic insulating material, for example, silicon oxide ($SiO_2$) or silicon nitride (SiNx).

A common electrode 138 is formed on the passivation layer 136. The common electrode 138 has at least one hole 139 and faces the pixel electrode 124. The common electrode 138 may be made of a transparent conductive material, for example, indium-tin-oxide (ITO), indium-zinc-oxide (IZO) or indium-tin-zinc-oxide (ITZO). Voltages are applied to the pixel electrode 124 and the common electrode 138, thus an electric field called as a fringe field is induced between the pixel and common electrodes 124 and 138.

A black matrix 140, a color filter layer 142 and an overcoat layer 146 are formed sequentially on an inner surface of the second substrate 102. The black matrix 140 corresponds to the thin film transistor Tr, the gate line 114 and the data line 130 and prevents light leakage. The color filter layer 142 is formed on the black matrix 140 and corresponds to the pixel region P. The color filter layer 142 includes red, green and blue color filter patterns 142a, 142b and 142c. The overcoat layer 146 covers the black matrix 140 and the color filter layer 142 for planarization.

As described above, the liquid crystal layer 103 is located between the first and second substrates 101 and 102, and the fringe field induced between the pixel and common electrodes 124 and 138 operates liquid crystal molecules of the liquid crystal layer 103.

Alternatively, the pixel electrode and the common electrode may have a comb shape, thus the liquid crystal layer 103 may be operated by an in-plane electric field between the pixel and common electrodes. Alternatively, the common electrode may be formed on the second substrate, thus the liquid crystal layer 103 may be operated by a vertical electric field between the pixel and common electrodes.

The first and second polarizing films 152 and 154 may have first and second polarizing axes perpendicular to each other. Accordingly, the first polarizing film 152 transmits light parallel to the first polarizing axis among lights emitted from the backlight unit 120 while the second polarizing film 154 transmits light parallel to the second polarizing axis.

Figure 4:
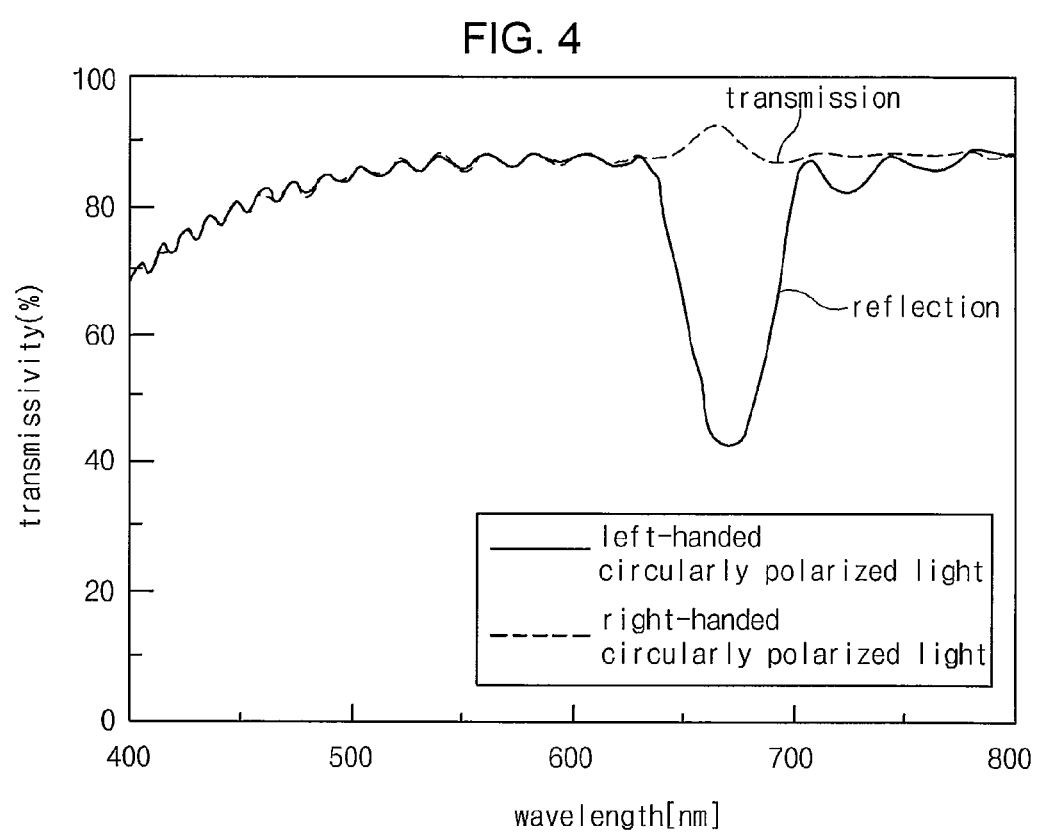
FIG. 4 is a graph illustrating an optical property of the titanium oxide film according to the first embodiment of the present invention.

A titanium oxide film 160 is formed on an outer surface of the second polarizing film 154. The titanium oxide film 160 is formed through an oblique-angle deposition process thus has a helical structure. The obliquely deposited titanium oxide film 160 has a property of transmitting one of left-handed circularly polarized light and right-handed circularly light and reflecting the other. A color due to an external light reflecting off the titanium oxide film 160 i.e., a reflection color is determined by a helical pitch and a thickness of the titanium oxide film 160. The titanium oxide film 160 may be obliquely deposited on the second polarizing film 154. Alternatively, the titanium oxide film 160 may be obliquely deposited on the protection substrate 170 then attached onto the second polarizing film 154. In the deposition of the titanium oxide film 160, an oblique angle may be 30 to 80 degrees. horizontal FIG. 4 is a graph illustrating an optical property of the titanium oxide film according to the first embodiment of the present invention. It is assumed that the titanium oxide film transmits right-handed circularly polarized light and reflects left-handed circularly polarized light with a specific wavelength.

Referring to FIG. 4, the titanium oxide film 160 transmits right-handed circularly polarized light and reflects left-handed circularly polarized light with a specific wavelength, for example, about 760 nanometers (nm). This property is made by adjusting the helical pitch and the thickness of the titanium oxide film 160. Accordingly, the reflection color from the titanium oxide film 160 is substantially a red. This red is in harmony with a red exterior case surrounding the LCD device 100 equipped in an electronic device, for example, a mobile station.

As a result, by adjusting the helical pitch and the thickness of the titanium oxide film 160, a desired reflection color, which is in harmony with the colored exterior case of the electronic device, can be seen from the LCD device 100 in display off state. The display off state may mean a state that the LCD device 100 does not display images. For example, in a sleep mode or power off mode of the electronic device, the LCD device 100 has the display off state. To the contrary, a display on state may mean a state that the LCD device 100 displays images. The backlight unit 120 may be turned on and off in the display on and off states, respectively.

The protection substrate 170 is located on the titanium oxide film 160 and functions to protect the titanium oxide film 160. Alternatively, the protection substrate 170 may be omitted from the LCD device 100.

The titanium oxide film 160 can be formed in simple processes and with thin thickness, compared to the cholesteric liquid crystal film of the related art. Accordingly, the LCD device 100 can be manufactured simpler and thinner. Further, the titanium oxide film 160 can make the same reflection color substantially seen at not only front viewing angles but also side viewing angles.

In the display on state of the LCD device 100, transmissivity of light emitted from the backlight unit 120 is adjusted by operation of the liquid crystal layer 103. Then, the light passing through the liquid crystal panel 110 passes through the second polarizing film 154, the titanium oxide film 160 and the protection substrate 170, thus images are displayed.

However, in the display on state, since light emitted from the backlight unit 120 have a linear polarized state and the titanium oxide film 160 transmits, for example, right-handed circularly polarized light among lights incident thereon thus images are displayed, transmissivity of the LCD device 100 may be reduced.

To further improve the transmissivity reduction of the LCD device, another LCD device is suggested as follows.

Figure 5:
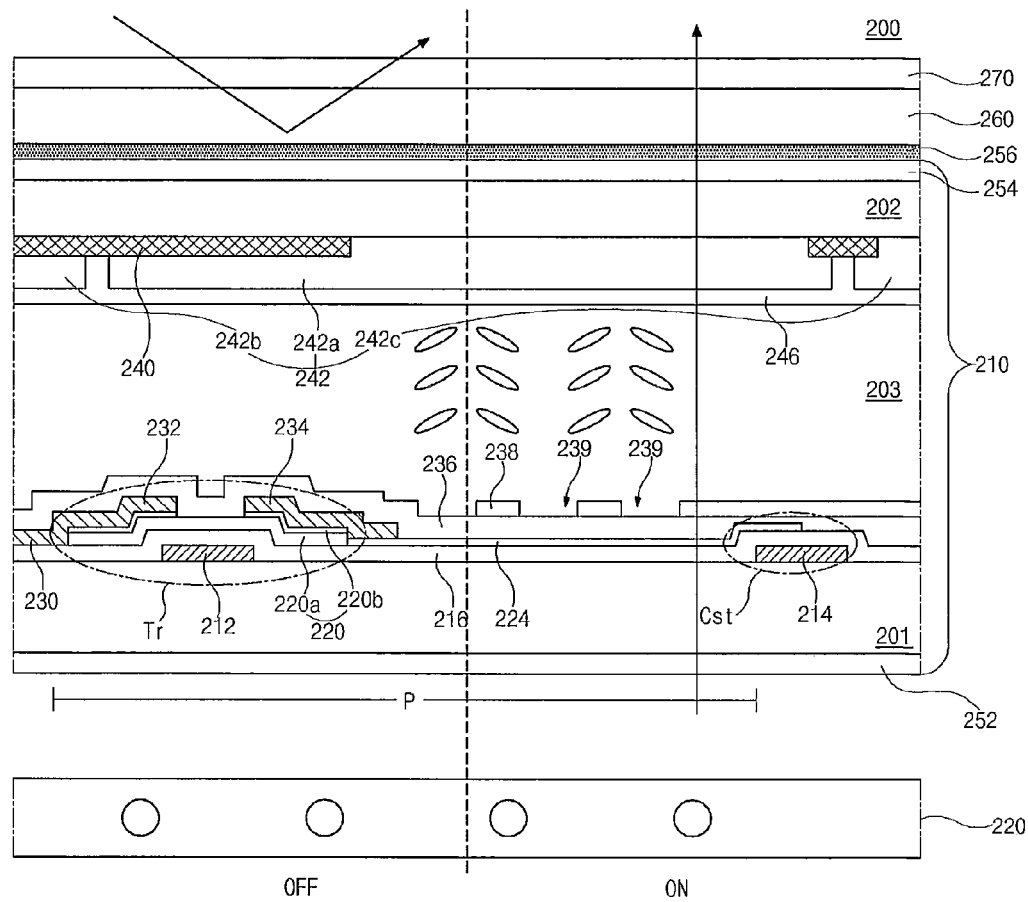
FIG. 5 is a schematic cross-sectional view illustrating an LCD device according to a second embodiment of the present invention.

FIG. 5 is a schematic cross-sectional view illustrating an LCD device according to a second embodiment of the present invention. The LCD device of the second embodiment is similar to that of the first embodiment. Accordingly, explanations of parts similar to parts of the first embodiment may be omitted.

Referring to FIG. 5, the LCD device 200 includes a liquid crystal panel 210, first and second polarizing films 252 and 254 on bottom and top surfaces of the liquid crystal panel 210, respectively, a backlight unit 220 below the first polarizing film 252, and a titanium oxide ($TiO_2$) film 260 on the second polarizing film 254. A protection substrate 270 may be formed on the titanium oxide film 260. Further, the LCD device 200 includes a phase retardation film 256 between the second polarizing film 254 and the titanium oxide film 260.

The liquid crystal panel 210 includes first and second substrate 201 and 202 facing each other, and a liquid crystal layer 203 between the first and second substrates 201 and 202.

A gate electrode 212 and a gate line 214 connected to the gate electrode 212 is formed on an inner surface of the first substrate 201. The gate electrode 212 and the gate line 214 may be formed in a single-layered structure using a metallic material, for example, aluminum (Al), aluminum alloy (e.g., AlNd), molybdenum (Mo), copper (Cu), or copper alloy. Alternatively, the gate electrode 212 and the gate line 214 may be formed in a multi-layered structure using the metallic material as recited above. For example, the gate electrode 212 and the gate line 214 may have a triple-layered structure that a first layer is made of copper (Cu), and second and third layers are located below and on the first layer and made of molybdenum-titanium alloy (MoTi).

A gate insulating layer 216 is formed to cover the gate electrode 212 and the gate line 214. The gate insulating layer 216 is made of an inorganic insulating material, for example, silicon oxide ($SiO_2$) or silicon nitride (SiNx).

A semiconductor layer 220 is formed on the gate insulating layer 216 and located to correspond to the gate electrode 212. The semiconductor layer 220 includes an active layer 220a and an ohmic contact layer 220b. The active layer 220a may be made of intrinsic amorphous silicon, and the ohmic contact layer 220b may be made of extrinsic amorphous silicon.

A pixel electrode 224 is formed on the gate insulating layer 216 and located to correspond to a pixel region P. The pixel electrode 224 is made of a transparent conductive material, for example, indium-tin-oxide (ITO), indium-zinc-oxide (IZO), or indium-tin-zinc-oxide (ITZO). The pixel electrode 224 may contact a side surface of the semiconductor layer 220, or be spaced apart from the semiconductor layer 220.

The pixel electrode 224 may overlap the gate line 214 to form a storage capacitor Cst. In other words, a portion of the gate line 214 and a portion of the pixel electrode 224 overlapping each other function as a first electrode and a second electrode, respectively, thus these overlapped portions form the storage capacitor Cst along with the gate insulating layer 216 therebetween.

A data line 230 crossing the gate line 214 to define the pixel region P is formed on the gate insulating layer 216.

A source electrode 232 and a drain electrode 234 are formed on the semiconductor layer 220. The source electrode 232 is connected to the data line 230, and the drain electrode 234 is spaced apart from the source electrode 232. The drain electrode 234 contacts the pixel electrode 224. The active layer 220a is exposed through a space between the source and drain electrode 232 and 234.

The data line 230, the source electrode 232, and the drain electrode 234 may be formed in a single-layered structure using a metallic material, for example, aluminum (Al), aluminum alloy (e.g. AlNd), molybdenum (Mo), copper (Cu), or copper alloy. Alternatively, the data line 230, the source electrode 232, and the drain electrode 234 may be formed in a multi-layered structure using the metallic material as recited above. For example, the data line 230, the source electrode 232, and the drain electrode 234 may have a triple-layered structure that a first layer is made of copper (Cu), and second and third layers are located below and on the first layer and made of molybdenum-titanium alloy (MoTi).

The gate electrode 212, the gate insulating layer 216, the semiconductor layer 220, and the source and drain electrodes 232 and 234 form a thin film transistor Tr. The thin film transistor Tr is connected to the gate line 214, the data line 230 and the pixel electrode 224.

A passivation layer 236 may be formed to cover the thin film transistor Tr, the data line 230 and the pixel electrode 224. The passivation layer 236 may be made of an organic insulating material, for example, benzocyclobutene (BCB) or photo acrylic, or an inorganic insulating material, for example, silicon oxide ($SiO_2$) or silicon nitride (SiNx).

A common electrode 238 is formed on the passivation layer 236. The common electrode 238 has at least one hole 239 and faces the pixel electrode 224. The common electrode 238 may be made of a transparent conductive material, for example, indium-tin-oxide (ITO), indium-zinc-oxide (IZO) or indium-tin-zinc-oxide (ITZO). Voltages are applied to the pixel electrode 224 and the common electrode 238, thus an electric field called as a fringe field is induced between the pixel and common electrodes 224 and 238.

A black matrix 240, a color filter layer 242 and an overcoat layer 246 are formed on an inner surface of the second substrate 202. The black matrix 240 corresponds to the thin film transistor Tr, the gate line 214 and the data line 230 and prevents light leakage. A color filter layer 242 is formed on the black matrix 240 and corresponds to the pixel region P. The color filter layer 242 includes red, green and blue color filter patterns 242a, 242b and 242c. The overcoat layer 246 covers the black matrix 240 and the color filter layer 242 for planarization.

As described above, the liquid crystal layer 203 is located between the first and second substrates 201 and 202, and the fringe field induced between the pixel and common electrodes 224 and 238 operates liquid crystal molecules of the liquid crystal layer 203.

Alternatively, the pixel electrode and the common electrode may have a comb shape, thus the liquid crystal layer 203 may be operated by an in-plane electric field between the pixel and common electrodes. Alternatively, the common electrode may be formed on the second substrate, thus the liquid crystal layer 203 may be operated by a vertical electric field between the pixel and common electrodes.

The first and second polarizing films 252 and 254 may have first and second polarizing axes perpendicular to each other. Accordingly, the first polarizing film 252 transmits light parallel to the first polarizing axis among lights emitted from the backlight unit 220 while the second polarizing film 254 transmits light parallel to the second polarizing axis.

A phase retardation film 256 is formed on an outer surface of the second polarizing film 254. The phase retardation film 256 retards linearly polarized light by the second polarizing film 254 in, for example, $\lambda/4$. For example, when the titanium oxide film 260 transmits right-handed circularly polarized light and reflects left-handed circularly polarized light, the linearly polarized light through the phase retardation film 256 is changed into right-handed circularly polarized light.

A titanium oxide film 260 is formed on the phase retardation film 256. The titanium oxide film 260 is formed through an oblique-angle deposition process thus has a helical structure. The obliquely deposited titanium oxide film 260 has a property of transmitting one of left-handed circularly polarized light and right-handed circularly light and reflecting the other. A reflection color is determined by a helical pitch and a thickness of the titanium oxide film 260. The titanium oxide film 260 may be obliquely deposited on the phase retardation film 256. Alternatively, the titanium oxide film 260 may be obliquely deposited on the protection substrate 270 then attached onto the phase retardation film 256. In the deposition of the titanium oxide film 260, an oblique angle may be 30 to 80 degrees.

The titanium oxide film 260, for example, transmits right-handed circularly polarized light and reflects left-handed circularly polarized light with a specific wavelength. This property is made by adjusting the helical pitch and the thickness of the titanium oxide film 260. Accordingly, by adjusting the helical pitch and the thickness of the titanium oxide film 260, a desired reflection color, which is in harmony with the colored exterior case of the electronic device, can be seen from the LCD device 200 in display off state.

The protection substrate 270 is located on the titanium oxide film 260 and functions to protect the titanium oxide film 260. Alternatively, the protection substrate 270 may be omitted from the LCD device 200.

In the display on state of the LCD device 200, transmissivity of light emitted from the backlight unit 220 is adjusted by operation of the liquid crystal layer 203. Then, the light passing through the liquid crystal panel 210 passes through the second polarizing film 254, the phase retardation film 256, the titanium oxide film 260 and the protection substrate 270, thus images are displayed. The linearly polarized light through the second polarizing film 254 is changed into, for example, right-handed circularly polarized light through the phase retardation film 256 then passes through the titanium oxide film 260 having a property of transmitting right-handed circularly polarized light. Therefore, light transmissivity of the LCD device 200 can increase.

Further, the titanium oxide film 260 can be formed in simple processes and with thin thickness, compared to the cholesteric liquid crystal film of the related art. Accordingly, the LCD device can be manufactured simpler and thinner. Further, the titanium oxide film 260 can make the same reflection color substantially seen at not only front viewing angles but also side viewing angles.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a liquid crystal panel;
   a first polarizing film and a second polarizing film on a bottom surface and a top surface, respectively, of the liquid crystal panel;
   a backlight unit below the first polarizing film; and
   a titanium oxide film directly formed on the second polarizing film and that transmits one of right-handed circularly polarized light and left-handed circularly polarized light and reflects the other, with a predetermined wavelength, of the right-handed circularly polarized light and the left-handed circularly polarized light.

2. A liquid crystal display device, comprising:
   a liquid crystal panel;
   a first polarizing film and a second polarizing film on a bottom surface and a top surface, respectively, of the liquid crystal panel;
   a backlight unit below the first polarizing film;
   a titanium oxide film on the second polarizing film and that transmits one of right-handed circularly polarized light and left-handed circularly polarized light and reflects the other, with a predetermined wavelength, of the right-handed circularly polarized light and the left-handed circularly polarized light; and
   a phase retardation film between the second polarizing film and the titanium oxide film and that changes linearly polarized light into the one of the right handed circularly polarized light and the left-handed circularly polarized light which the titanium oxide film transmits,
   wherein the phase retardation film is directly formed on the second polarizing film.

3. The device according to claim 2, wherein the titanium oxide film has a helical structure through oblique deposition.

4. The device according to claim 3, wherein the predetermined wavelength is determined by a helical pitch and a thickness of the titanium oxide film.

5. The device according to claim 2, wherein the liquid crystal panel includes:
   a first substrate and a second substrate facing each other;
   a thin film transistor on the first substrate;
   a pixel electrode on the first substrate and connected to the thin film transistor;
   a common electrode on one of the first and second substrates; and
   a liquid crystal layer between the first and second substrates.

6. The device according to claim 2, further comprising a protection substrate on the titanium oxide film.

7. The device according to claim 2, wherein the first polarizing film has a first polarizing axis, and the second polarizing film has a second polarizing axis perpendicular to the first polarizing axis.

* * * * *